No. 818,979. PATENTED APR. 24, 1906.
W. T. SCHEELE.
PROCESS OF PRESERVING ORGANIC MATTER.
APPLICATION FILED MAY 25, 1905.
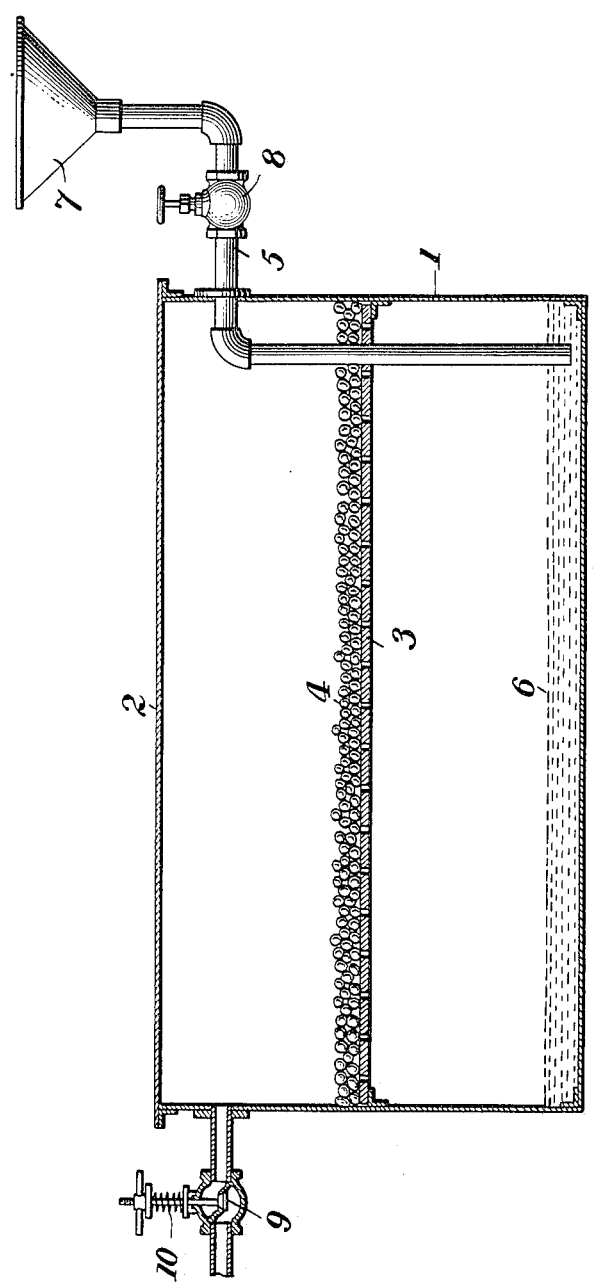

UNITED STATES PATENT OFFICE.

WALTER T. SCHEELE, OF BALTIMORE, MARYLAND, ASSIGNOR TO WILLIAM J. HOOPER, OF BALTIMORE, MARYLAND.

PROCESS OF PRESERVING ORGANIC MATTER.

No. 818,979.     Specification of Letters Patent.     Patented April 24, 1906.

Application filed May 25, 1905. Serial No. 262,247.

*To all whom it may concern:*

Be it known that I, WALTER T. SCHEELE, a subject of the German Emperor, residing at West Arlington, Baltimore city, Maryland, have invented certain new and useful Improvements in Processes of Preserving Animal and Vegetable Matter, of which the following is a specification.

The present invention relates to a process of preserving animal or vegetable matter of any kind. This process is especially valuable for the preservation of food products, and products so preserved may be kept indefinitely.

Among the valuable features of my process are the freedom of the product from bacteria and the fact that the food or other dried material retains its natural color and flavor. This is due to the fact that the albumen in the products is simply dried by my process and not coagulated, as is done in the ordinary cooking processes.

The present process consists in placing the substance to be preserved in a closed vessel together with a properly proportioned amount of liquid air. A small valve or vent is provided for the gradual escape of the air as it expands. The substance to be dried is preferably placed upon a tray above the liquid air, the apparatus being so arranged that the air as it gasifies must pass through the substance. The liquid air is practically free from moisture, and the gaseous air produced is therefore thoroughly dry. I have found that such air will very rapidly carry off the moisture in animal or vegetable matter and leave such matter in a perfectly dry condition. As the drying out of the substance under treatment is done without heat, the albumen is not coagulated, but is simply dried. Vegetable matter so dried may be restored to its natural condition by simply soaking it in water for a short time, the amount of time depending upon the nature of the substance.

This process is applicable to the drying of potatoes, tomatoes, peas, beets, and other vegetables. It is also applicable to the drying of meats and milk. The germs of seeds dried by this process are not killed, and such seeds may be stored for years without destroying their usefulness.

In the accompanying drawing I have illustrated a simple apparatus by means of which my process may be practiced. Referring to the drawing, 1 indicates a tank or box having a removable cover 2. Within the box is a tray 3, adapted to hold the substance 4 to be dried. The tray is perforated to permit of the circulation of air through the material 4. The apparatus is provided with a filling-tube 5, through which liquid air 6 is introduced into the bottom of the tank. The filler may be provided with the usual funnel 7 and with a valve 8. The apparatus is also preferably provided with an air-escape valve 9, which is normally closed by a light spring 10.

The operation of the apparatus is as follows: The liquid air gradually gasifies and fills the apparatus with dry air. This air, owing to its expansion and the motion incident thereto and incident to its escape through the vent 9, circulates through the material to be dried and finally passes out through the valve 9. It is found that the material under treatment will be rapidly dried by this simple apparatus and will retain to a large extent its natural color and appearance, although shrinking in size very materially.

Large fruits and vegetables, such as apples and potatoes, should be sliced in order to dry them more rapidly, while peas, beans, and other small vegetables, fruits, or seeds may be readily dried whole. In all substances subjected to my process of drying the albumen is found to be perfectly dry and not coagulated. It is for this reason that the color, taste, and other qualities of food products are preserved.

Food products preserved by my process may be packed in air-tight cans, jars, or other receptacles. They may, however, be safely and more economically packed in paper receptacles, especially in waxed or other air-tight paper.

It will be evident that my process may be carried out by means of various forms of apparatus, and therefore, without limiting my self to the apparatus illustrated and described, I claim—

The herein-described process of preserving organic matter, consisting in desiccating the same by exposing it to the vapors or gases which are liberated from a body of liquid air placed in close proximity thereto, in a closed chamber under the exclusion of the outer air.

In testimony whereof I have signed my name to this specification in the presence of two subscribing witnesses.

WALTER T. SCHEELE.

Witnesses:
J. A. WATSON,
B. C. RUST.